United States Patent [19]

Cook

[11] 4,119,087
[45] Oct. 10, 1978

[54] SOLAR WATER HEATING SYSTEM

[75] Inventor: Robert E. Cook, Kankakee, Ill.

[73] Assignee: A. O. Smith Corporation, Milwaukee, Wis.

[21] Appl. No.: 708,876

[22] Filed: Jul. 26, 1976

[51] Int. Cl.² .............................................. F24J 3/02
[52] U.S. Cl. ................................................... 126/271
[58] Field of Search ........................................ 126/271

[56] References Cited

U.S. PATENT DOCUMENTS

| 1,425,174 | 8/1922  | Cartter et al. | 126/271 |
| 1,888,620 | 11/1932 | Clark          | 126/271 |
| 1,889,238 | 11/1932 | Clark          | 126/271 |
| 2,402,326 | 6/1946  | Harkness       | 126/271 |
| 3,970,069 | 7/1976  | Pickett        | 126/271 |
| 3,986,489 | 10/1976 | Schlesinger    | 126/271 |
| 3,989,032 | 11/1976 | Harrison       | 126/271 |
| 4,044,754 | 8/1977  | Cronin et al.  | 126/271 |

Primary Examiner—Lloyd L. King
Attorney, Agent, or Firm—Andrus, Sceales, Starke & Sawall

[57] ABSTRACT

A solar water heating system in which piping arrangements and solenoid operated valves are combined with a water storage heater and solar heater or collectors in a manner to protect the system against over temperature and against freezing without the use of antifreeze or auxiliary heat exchanger systems.

3 Claims, 2 Drawing Figures

SOLAR WATER HEATING SYSTEM

BACKGROUND OF THE INVENTION

The invention is distinguished over the prior known solar heating of stored water in that protection is provided against over temperature and against freezing without the use of antifreeze or auxiliary heat exchanger systems for solar collectors. As a secondary part of the concept of the invention the piping arrangement provided is adapted to utilize existing storage systems with a minimum of piping changes, or to provide a piping system for new installations which tends to maximize water temperature differential in the solar heating panel.

SUMMARY OF THE INVENTION

In general, normal operation of the system provides for a temperature sensing device which is shown as located within the outlet manifold header of the collector panels of the solar heater but which may be disposed inside the solar collector panels. This temperature sensing device operates a circulator or pump which pumps the water through the collector panel into the storage tank whenever the temperature within the panels is within a preselected temperature range. Should a combination of relatively little water usage or high solar pick up case the temperature in the panels to exceed the preselected temperature, a temperature controller sensing the outlet or panel temperatures opens a solenoid valve which dumps the stored water in the collector panel to drain. In the event of electric power failure or in the event the solenoid valve fails to operate, a redundant temperature relief valve which is set a few degrees higher than the temperature controller is actuated to open a bypass passage to the drain pipe to dump the water in the solar panel. Properly located check valves in the piping system contribute to the dumping action caused by the over temperature of the solar collector or panels.

In order to protect the system against freezing the temperature sensing device is set at a preselected temperature safely above freezing and when this low temperature is reached it will start the circulator. The circulator runs long enough to assure that the water in the collector panels is kept above freezing. In the event that the electrical power fails or the warm water is exhausted from the water storage tank or the system otherwise malfunctions so that the water temperature continues to drop in the panels such as to the freezing point, power will be interrupted by the temperature sensor to a system of solenoid valves which will then be mechanically actuated to shut off incoming water to the panels, open drains and allow the water in the collector panels to drain off. An alternate system but probably less desirable is to provide the low temperature sensing device with an alarm system rather than with dumping solenoids and the system then can be mechanically drained.

DESCRIPTION OF THE PREFERRED EMBODIMENT

Figure 1:
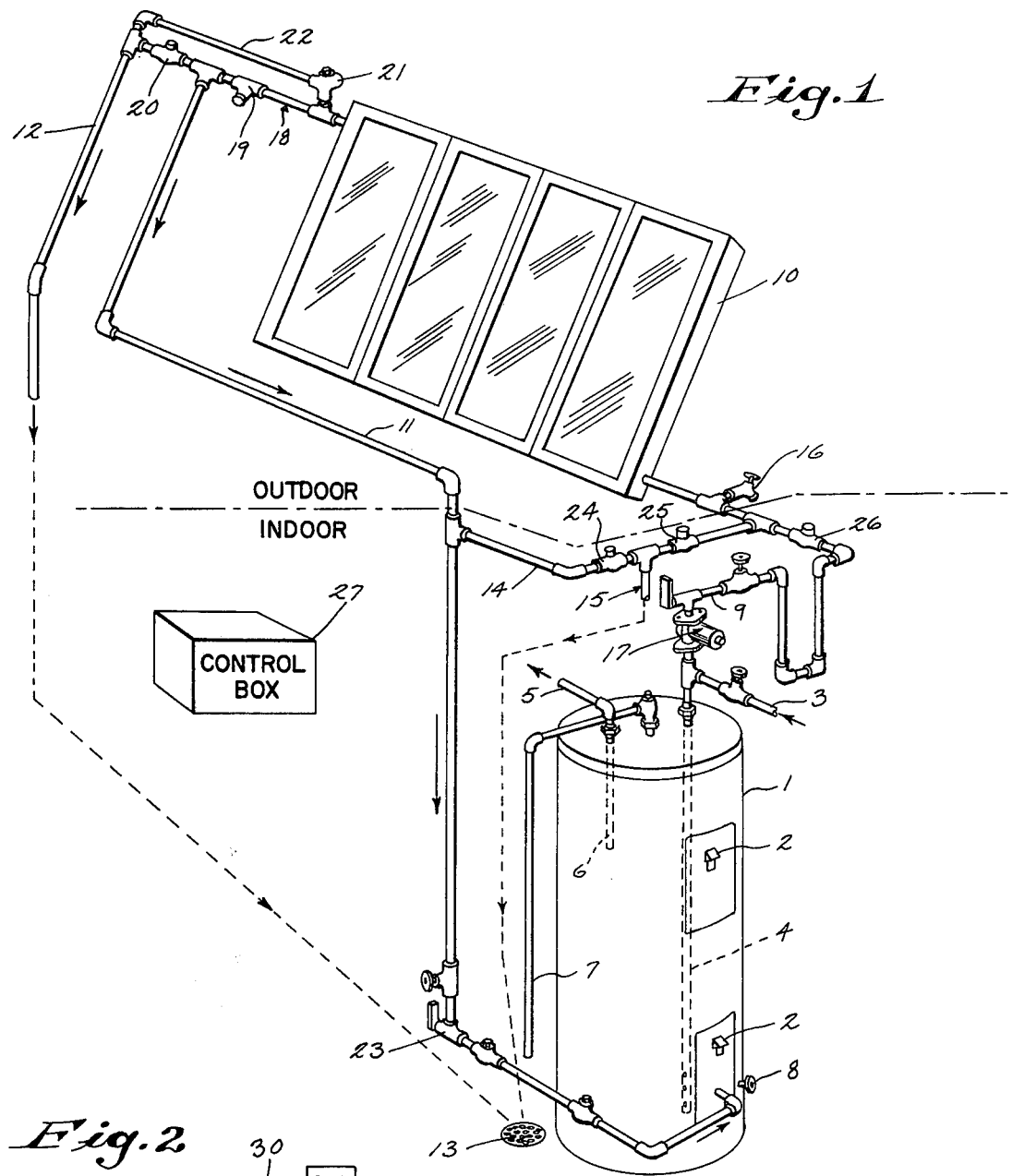
FIG. 1 is a diagrammatic illustration of a hot water heating system employing a solar collector.

Referring to the drawing, the embodiment of the invention is described in connection with a hot water heating system employing a hot water storage tank 1 and the water stored therein, if necesary, under certain conditions is heated by the upper and lower electric heating elements 2. Gas or fossil fuel may also be employed to provide the auxiliary heating of the water stored in tank 1.

Cold water enters tank 1 from inlet 3 and flows to the bottom of the heater through dip tube 4. The hot water is discharged through outlet 5 and is protected against corrosion by the anode 6. A pipe 7 is connected to a valve at the upper end of the tank for drainage in the event of buildup of pressure inside tank 1 and the lower drain 8 is also provided.

Water flows from the bottom of tank 1 by means of dip tube 4 or from cold water inlet 3 through piping 9 to the solar heater or collector 10 of well-known construction and after heating therein returns from solar heater 10 to the bottom of tank 1 through piping 11.

Drain piping 12 is connected to return piping 11 for dumping of water to drain 13 under certain conditions and piping 14 is connected between piping 9 and 11 and also includes piping 15 for dumping water from collector panels 10 to drain 13. The collector panels 10 may also be manually drained by opening valve 16 in piping connected to piping 9.

A solar circular 17 is provided in line 9 for positively circulating or pumping water through the system as for example from inlet 3 or tank 1 through line 9 to solar collector panels 10 and thence to tank 1 through piping 11 whenever the temperature of the water in collector panels 10 is within a preselected temperature range, for example, 110° F. to 165° F.

The system provides for fail safe and redundant protection against over temperature and also against freezing. With respect to the latter, the line in FIG. 1 of the drawing designated indoor and outdoor illustrates that part of the equipment which normally would be located outdoors and subject to freezing as well as the parts below the line located indoors.

Figure 2:
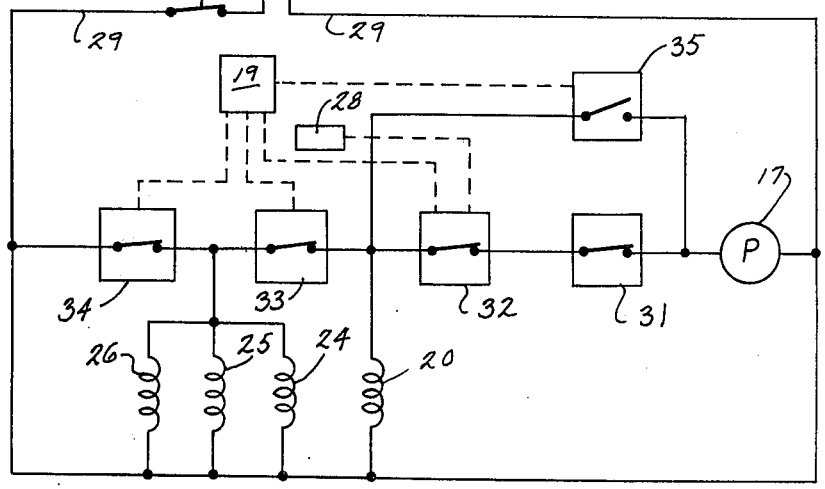
FIG. 2 is a diagrammatic circuit diagram illustrating the electrical system of the invention.

Referring to the protection portion of the system against over temperatures, the outlet mainfold header 18 is connected to adjustable solar heater temperature sensor 19, the internal construction of which is illustrated in FIG. 1 and in the circuit diagram in FIG. 2. In the event a combination of little water usage and high solar pick up results in the temperature in solar heater 10 exceeding a preselected temperature, such as 190° F, for examle, the temperature sensor 19 sensing the temperature of the water in header 18 will actuate a solenoid valve 20 in the header 18 to normally open position which effects dumping of the water in collector panel 10 through drain line 12 to drain 13. Should the electric power fail or solenoid valve 20 fail to operate, a redundant temperature pressure relief valve 21 located in the bypass pipe line 22 and which is set 5° - 10° higher than that of temperature sensor 20 will mechanically open and empty the water from the solar panel 10 into drain line 12.

The check valve 23 in line 11 prevents stored water in tank 1 from flowing back through line 11 and dumping into drain line 12.

Referring next to protection of the system against freezing, additional controls and redundant protection are supplied and there is also included an automatic drain down in case of power failure.

The present system provides protection against freezing by using the potable water from the system itself. This is also accomplished by the solar collector temperature sensor 19 which is disposed to sense the temperature of the water in manifold header 18 and which will start solar ciculator 17 to circulate water through the system whenever the water in solar panel 5 drops below a predetermined safe limit such as 35° F. Circulator or pump 17 will run just long enough to assure that the water in collector panels 10 is kept above freezing. Tests have indicated that negligible amounts of recirculated water are required for this purpose.

In the event that electric power is not available or the warm water is exhausted from the storage tank or other malfunction in the system occurs so that the water temperature continues to drop within solar panel 10 such as by 3° – 4° or to the freezing point, power will be interrupted, if the power is still on, by the temperature sensor 19 to solenoid valves 24 and 25 disposed on either side of the drain piping 15 in line 14, and to solenoid valve 20 located in header 18 so that these solenoid operated valves will move to their normally open position. At the same time the solenoid valve 26 in piping 9 will move to a normally closed position. Water can then drain from solar panel 10 through pipes 11 and 14 to drain pipe 15 for dumping. Also the water can drain out of mainfold header 18 through drain line 12 to drain 13 or back through line 9 and piping 14 to drain pipe 15. Closed solenoid valve 26 prevents back flow from solar panel 10 to tank 1.

Referring to the wiring diagram illustrated in FIG. 2, there is illustrated the electric circuitry which is located in the control box 27 which would be part of the system which is shown as secured indoors.

The operating circuit for controlling of the water circulation through the system is controlled by the solar heater temperature sensor 19 and a tank temperature sensor 28, which are interconnected by dashed coupling lines in circuit with the circulating pump 17 and the solenoid valves 20, 24, 25 and 26 and the relays which will be described as shown in FIG. 2. Tank temperature sensor 28 may be located in the lower heating element 2 but is only shown in FIG. 2. Conventional power supply lines 29 are provided and include a main on-off switch 30 for opening and closing of the circuit to the pump 17 and to the solenoid valves 20, 24, 25 and 26.

Pump 17 is connected to the power supply through a series of relays and a tank temperature limit switch 31. The relays are controlled by the temperature sensors 19 and 28.

A normal operating circuit is provided with pump 17 connected to the one side of the power lines. The tank limit switch 31 is connected to the opposite side of pump 17 such that if the temperature in the tank rises above a selected level the switch opens to prevent normal energization of pump 17. Normal operating and temperature differential relay 32 is connected between tank limit switch 31 and the opposite side of line 29 in series with a high temperature limit relay 33 and a low temperature limit relay 34. The latter relays 33 and 34 are normally closed in the absence of abnormal conditions, as hereinafter described.

In normal operation, the temperature differential relay 32 is connected to both the solar heater temperature sensor 19 and the tank temperature sensor 28 and is controlled to open and close the circuit in accordance with the level of the temperature in solar heater 10 relative to the temperature in tank 1. This action limits the circulation of water to tank 1 from solar heater 10 to those conditions under which water can be appropriately transferred to the storage tank.

In particular, the temperature differential relay 32 includes suitable means responsive to the temperature level of sensors 19 and 28; for example, conventional temperature sensitive resistance elements which are connected in a switching network within the relay for opening and close of the relay. More particularly, relay 32 is closed when the solar heater temperature as sensed by sensor 19 is above the temperature of storage tank 1 by a significant level; for example, 25° F. Relay 32 once closed is maintained closed as a result of a suitable internal circuitry or any other suitable means until such time as the temperature of solar heater 10 drops to a selective level above the level of the temperature in tank 1; for example, 3° F. When the relay 32 opens, pump 17 stops and water is trapped in solar heater 10. The system remains in a non-circulating condition until such time as the temperature in solar heater 10 increases again to a level 25° F. above the temperature of the water in tank 1. At that time, relay 32 again closes and initiates the same circulation of water through the system.

The solenoid valve 20 is normally open and connected by header 18 to the discharge side of the solar collector 10 and to drain 13. Solenoid valve 20 is normally maintained energized to keep it closed by connection in a series connection directly across power lines 29 which includes the high temperature limit relay 33 and the low temperature limit relay 34. Thus, solenoid valve 20 is connected in parallel with pump 17 and the normal operating relay 32 to maintain solenoid valve 20 energized under normal operating conditions.

If the temperature of solar collector 10 should reach an abnormally high level; for example, 200° F., the output of the sensor 19 will be such as to open the normally closed relay 33. This opens the circuit to pump 17 and simultaneously to solenoid valve 20. Solenoid valve 20 reverts to its normally open position connecting the output side of the solar collector or header 18 directly to drain 13. The solenoid valves 20, 24, 25 and 26 are maintained energized to prevent the direct draining of solar collector 10. When the temperature level is reduced the relay 33 will again close, resetting the circuit permitting operation of pump 17 and closing of the solenoid valve 20 as a result of the energization thereof.

The normally open solenoid valves 24 and 25 and the normally closed solenoid valve 26 are connected in parallel with each other and in series also with the low temperature relay 34 across the power lines 29. Solenoid valves 20, 24, 25 and 26 are thus energized to maintain the inlet of water and prevent the draining of solar heater 10 through the drain system as long as the temperature of solar collector 10 does not drop below a predetermined low limit.

If the collector temperature sensor 19 senses the approach of a damaging low temperature in solar heater 10, a relay 35, which is coupled to the sensor 19, is actuated and closed. Relay 35 is connected in parallel with the tank limit switch 31 and the normal operating relay 32 and directly energizes pump 17 to continuously circulate water through solar collector 10 and the tank system even though the desired temperature differential characteristic may not exist. Thus the water will be circulated through the solar system to positively prevent localized freezing or the like. The system may be set to close the relay 35 if the sensor 19 temperature drops to, for example, 39° F.

The solenoid valves 20, 24, 25 and 26 are maintained energized under the condition of an approaching low temperature as a result of the connection to the power supply lines 29 of only the relays 33 and 34.

If the temperature in the collector should drop below a selected level approaching the freezing level, the total system is drained to prevent damaging conditions. Referring to FIG. 2, temperature sensor 19 operates the low limit relay 34; for example, at 34° F. When relay 34 is energized it opens its contacts, thereby opening the circuit to pump 17, and to solenoid valves 20, 24, 25 and 26. Pump 17 stops operating, and the solenoids revert to the normal position. This effects closing of solenoid valve 26 which shuts off the flow supply water to solar collector 10 and opening of the solenoid valves 20, 24 and 25 to permit free movement of the water from collector 10 to the drain 13. The solenoid valve 20 further includes an automatic air vent, not shown, to permit entry of the air into the system to insure complete draining of the system.

In summary, the normal operating relay 32 is closed under normal conditions to effect circulation of water from solar collector 10 to tank 1 when the water in solar heater 10 is heated to a level 25° above tank 1 and continues the circulation until such time as the temperature of solar collector 10 is only such as 3° F. above the temperature of tank 1. Should the temperature of solar heater 10 rise to a dangerous level, relay 33 opens to couple solar collector 10 to the drain 13 through header 18 and piping 12 and simultaneously stops pump 17 and the circulation of water in the system to thereby release the pressure in the system for bypassing the heated waters from tank 1 to drain 13. When the temperature drops, relay 34 closes and reverts to normal.

Similarly if the temperature of solar heater 10 should drop to the lower limit, relay 34 is energized to open the circuit, terminating operation of the pump and effects complete draining of the system, thereby preventing damaging conditions from occurring.

The upper and lower heating elements 2 shown in the drawings are employed to illustrate an auxiliary heating system to heat the water tank 1 in the event the solar heating system fails or is operating under conditions where the water in tank 1 is not being effectively heated. Alternate fuel sources may also be employed as auxiliary heating systems.

Various modes of carrying out the invention are contemplated as being within the scope of the following claims, particularly pointing out and distincly claiming the subject matter which is regarded as the invention.

I claim:

1. A solar water heating system with forced circulation of the water which comprises, a water storage tank, a solar heater, piping system connecting the tank to the solar heater for flow of water between the tank and solar heater, a cold water inlet provided in the system, an electrical circuit connected to the system with power lines connecting the circuit to a source of power, a pump connected to said piping and to the electrical circuit to circulate the water in the piping when actuated by the electrical circuit, temperature sensing means connected to the piping system and to the electrical ciruit to sense the temperature of the water in the storage tank and electrically actuate the pump for circulation of water through the system within a normal preselected temperature range between the water in the tank and the water in the solar heater, first electrically operated valve means connected in the circuit to the temperature sensing means and actuated by the latter to stop operation of the pump when the temperature of the water in the solar heater rises above a preselected temperature range between the water in the storage tank and solar heater, additional electrically operated valve means connected to the electrical circuit and thereby to the sensing means and the pump and actuated by the temperature sensing means when the water in the solar heater drops to a selected low temperature to thereby stop operation of the pump and open the system to drain and shut off flow of water to the solar heater to prevent damage to the system by freezing, and the temperature sensing means including a solar heater temperature sensor connected at the water discharge end of the solar heater to sense the temperature of the solar heated water, a tank temperature sensor connected to the tank to sense the temperature of the water stored in the tank, and the first electrically operated valve means being a temperature differential relay electrically connected by the electrical circuit to the solar heater temperature sensor and the tank temperature sensor to open and close the circuit in accordance with the preselected differential in temperature in the solar heater relative to the temperature in the tank to limit the circulation of water to the tank from the solar heater within a desired temperature range.

2. The solar heating system of claim 1, and the piping system including a header extending from the discharge end of the solar heater, a drain connected to the header, the additional electrically operated valve means including a normally open solenoid valve located in the system between the header and drain pipe and adapted to assume the open position when the electrical circuit is closed, and the piping system including a first piping line extending between the tank and the inlet side of the solar heater for flow of water from the tank to the solar heater, a second piping line extending between the header and the tank for flow of heated water from the solar heater to the tank, a third piping line extending between the first piping line and a second piping line, a drain connected to the third piping line, a normally open solenoid valve located on each side of the drain in the third piping line, a normally closed solenoid valve located in the first piping line between the tank and the connection of the first piping line to the third piping line, the three normally open solenoid valves moving from closed to the normal open position to drain water from the system when the electrical system is shut down and the normally closed solenoid valve moving from open to the normally closed position to thereby shut off flow of water from the tank to the solar heater, and means in the system to stop the flow of water from the tank to drain when the electrical system is shut down.

3. The solar heating system of claim 2, and including a high temperature limit relay and a low temperature limit relay in the circuit actuated by the solar temperature sensor, and the first named normally open solenoid valve located between the header and drain pipe being normally energized by connection directly across the power line in series with the high temperature limit relay and the low temperature limit relay, a normal operating located in the circuit, and in addition the first named normally open solenoid valve being connected in parallel with said pump and the normal operating relay to maintain the first named normally open solenoid energized under normal operating conditions.

* * * * *

UNITED STATES PATENT AND TRADEMARK OFFICE
CERTIFICATE OF CORRECTION

PATENT NO. : 4,119,087
DATED : October 10, 1978
INVENTOR(S) : ROBERT E. COOK

It is certified that error appears in the above—identified patent and that said Letters Patent are hereby corrected as shown below:

Column 1, line 29, After "pick up" cancel "case" and insert ---cause---;

Column 2, line 31, After "solar" cancel "circular" and insert ---circulator---;

Column 5, line 50, After "and" cancel "distincly" and insert ---distinctly---;

Column 5, line 57, After "inlet" insert ---and hot water outlet---;
CLAIM 1

Column 6, line 63, After "operating" insert ---relay---.
CLAIM 3

Signed and Sealed this

Sixth Day of February 1979

[SEAL]

Attest:

RUTH C. MASON
Attesting Officer

DONALD W. BANNER
Commissioner of Patents and Trademarks